US006263750B1

(12) United States Patent
Maurer et al.

(10) Patent No.: US 6,263,750 B1
(45) Date of Patent: Jul. 24, 2001

(54) DEVICE FOR GENERATING DIRECTED VIBRATIONS

(75) Inventors: Thomas Maurer; Edith Kramp; Johann Breitenbach, all of Munich; Thomas Bromberger, Train; Alexander Mark, Unterschleissheim; Georg Sick, Feldafing, all of (DE)

(73) Assignee: Wacker-Werke GmbH & Co. KG, Munich (DE)

( * ) Notice: Subject to any disclaimer, the term of this patent is extended or adjusted under 35 U.S.C. 154(b) by 0 days.

(21) Appl. No.: 09/402,173

(22) PCT Filed: May 5, 1998

(86) PCT No.: PCT/EP98/02647

§ 371 Date: Sep. 28, 1999

§ 102(e) Date: Sep. 28, 1999

(87) PCT Pub. No.: WO98/50171

PCT Pub. Date: Nov. 12, 1998

(30) Foreign Application Priority Data

May 5, 1997 (DE) ........................................ 297 08 118 U
Sep. 19, 1997 (DE) ........................................ 197 41 413

(51) Int. Cl.[7] ........................ F16H 33/00; B01F 11/00
(52) U.S. Cl. ........................................ 74/61; 366/128
(58) Field of Search ........................ 74/61; 198/770; 164/203; 209/366, 367; 366/128; 404/117

(56) References Cited

U.S. PATENT DOCUMENTS

| | | | | |
|---|---|---|---|---|
| 2,531,706 | | 11/1950 | Signeul et al. | 74/61 |
| 3,203,264 | * | 8/1965 | Evans | 74/61 |
| 3,468,418 | * | 9/1969 | Renner | 209/315 |
| 3,583,246 | | 6/1971 | Magstadt | 74/61 |
| 3,703,236 | * | 11/1972 | Spurlin et al. | 74/61 X |
| 4,218,929 | * | 8/1980 | Spurlin | 74/61 |
| 5,056,244 | * | 10/1991 | Bryan, Jr. | 74/61 X |

FOREIGN PATENT DOCUMENTS

| | | |
|---|---|---|
| 196 34991 A1 | 6/1997 | (DE) . |
| 1 435 499 | 5/1976 | (GB) . |
| 2 103 333 | 2/1983 | (GB) . |

* cited by examiner

*Primary Examiner*—Allan D. Herrmann
(74) *Attorney, Agent, or Firm*—Boyle Fredrickson Newholm Stein & Gratz S.C.

(57) ABSTRACT

A device for generating directed vibrations has two centrifugal weights which are independently driven at the same speed of rotation but in opposite directions. The centrifugal weights are supported on a largely stiff carrier secured by a holder to a bracket. The holder allows the carrier to move relative to the bracket. When the centrifugal weights start moving, they become synchronized within a short period of time and generate vibrations which can be used in the desired manner via the bracket.

21 Claims, 2 Drawing Sheets

DEVICE FOR GENERATING DIRECTED VIBRATIONS

BACKGROUND OF THE INVENTION

1. Field of the Invention

The invention relates to a device for producing directional vibrations.

2. Description of the Related Art

Devices of this kind are known and are used to introduce directional vibrations into a structure. The structure can be a vibrating table for compacting concrete or an implement, e.g. a vibrating plate for soil compaction. In the case of vibrating tables, the directional vibrations are predominantly produced by vibrators positively synchronized by electrical/electronic or mechanical means or by pendulum vibrators.

The vibrators are two centrifugal weights which rotate in opposite directions and the mutually opposed centrifugal-force components of which cancel each other out, while the force component plane in the drawn perpendicularly to that through the axes of rotation of the centrifugal weights add up to give a resultant force and effect the vibration. The centrifugal weights are synchronized in a mechanical, electrical or electronic manner, in some cases with considerable complexity. To avoid the occurrence of damaging forces in a direction transverse to the actual direction of vibration, considerable precision of synchronization is required.

In the case of soil compaction equipment, especially vibrating plates, as in the case of vibrating tables, it is known that a purely directional vibration can be obtained by rotating two centrifugal weights with the same m x r (where m x r is the product of the mass of the unbalance weight and the radius of the center of gravity) in opposite directions at the same speed about mutually parallel axes. For this purpose, the unbalance weights in the known equipment, are mounted in a common housing and are coupled positively to one another for rotation and are both driven in opposite directions at the desired identical speed by a common drive.

Particularly when using vibrating tables, the known way of producing directional vibrations has proven problematic because of the high degree of design complexity associated with it and the costs this entails.

A device of this kind is known from GB-A-2 103 333. The device described has, inter alia, inflatable chambers, the variable stiffness of which determines the intensity of the vibration produced by centrifugal weights on a bracket.

OBJECTS AND SUMMARY OF THE INVENTION

The object on which the invention is based is therefore to specify a device by means of which directional vibrations can be produced and fed into a structure while keeping the complexity of the design to an acceptable level.

According to the invention, the object is achieved by a device with the features of patent claim 1. Advantageous developments of the invention can be taken from the dependent claims.

A device according to the invention for producing directional vibrations is distinguished by at least two centrifugal weights with essentially the same m x r which can be driven in rotation independently of one another in opposite directions at essentially the same speed about mutually parallel axes; a largely rigid carrier, on which the centrifugal weights, of which there are at least two, are rotatably mounted; and by a bracket on which the carrier can be mounted in such a way by means of a holder that the carrier can be moved relative to the bracket.

It has surprisingly been found that, when the drive for the centrifugal weights is switched on in the device designed in the manner described above, automatic synchronization of the two centrifugal weights takes place almost immediately if the carrier carrying the centrifugal weights has a certain freedom of motion 1) in a direction parallel to the common plane of the axes of rotation of the centrifugal weights, i.e. in a direction perpendicular to the direction of vibration and perpendicular to the axes of rotation of the centrifugal weights and 2) perpendicular to the common plane of the axes of rotation, i.e. in the direction of the vibrations to be produced. This freedom of motion is generally incorporated in the design by means of a certain elasticity of the material and, if required, can be adjusted to a suitable magnitude. However, it is a prerequisite for this that the carrier should be largely rigid. For this reason, the centrifugal weights of the unbalance-based vibration generator run as though they were coupled positively to one another to produce a purely directional vibration without this being in fact the case, thus avoiding the usual high design complexity in this respect and the associated proneness to faults. Furthermore, assembly is easier since the entire device can easily be disassembled into independent subcomponents. This is significant particularly when assembling vibrating tables.

For this reason, a particularly preferred embodiment of the invention is distinguished in that the carrier can be moved relative to the bracket in the direction of the directional vibration to be produced and in a direction perpendicular to the direction of vibration and perpendicular to the axes of rotation of the centrifugal weights.

The vibration to be produced is advantageously aligned perpendicular to a plane passing through the axes of rotation of the centrifugal weights.

In a particularly advantageous development of the invention, the holder has at least one spring element for transmitting the movement of the carrier in the direction of the directional vibration. The spring element can be a rubber-elastic element. In another advantageous development, the holder has at least one spring element for transmitting the movement of the carrier in a direction perpendicular to the direction of vibration and perpendicular to the axes of rotation of the centrifugal weights. The spring elements ensure mobility of the carrier in the holder and hence relative to the bracket without allowing impermissible play to occur between the carrier and the holder. The spring elements also provide effective noise reduction, especially when combined with damping elements, since the vibrations associated with structure-borne noise which are produced by the centrifugal weights and their drive are transmitted only partially to the bracket, if at all.

It is advantageous if the stiffness of the spring element or elements is matched to the stiffness of the carrier. This ensures that self-synchronization of the two centrifugal weights occurs irrespective of the structure to be excited.

A particularly advantageous embodiment of the invention is distinguished in that the holder has two holding units which are attached to the bracket and between which the carrier is accommodated in a movable manner. The holding units are situated opposite one another with the carrier in between them, allowing the carrier to be held reliably in position without the need for additional components.

It is advantageous if each of the holding units has a spring element into which the carrier is inserted.

In a preferred embodiment of the invention, a respective drive for each centrifugal weight is arranged on the carrier. Since, according to the invention, the centrifugal weights synchronize themselves automatically, it is not necessary to synchronize them additionally by mechanical, electrical or electronic components.

It can be particularly advantageous for the centrifugal weights to be divided in half axially with a drive motor arranged in between in each case in order to even out the bearing and shaft loads on the motors.

It is particularly advantageous if the bracket is part of a structure into which the directional vibrations can be introduced. This means that the holder or holding units are mounted directly on the structure to be excited or that the bracket can be attached to the structure as a structural unit together with the holder and the carrier.

It is likewise advantageous if the structure is a vibrating table or a vibrating plate because, when the device is used for such applications, the complex vibration generators previously known can be replaced with a more simple device.

BRIEF DESCRIPTION OF THE DRAWINGS

This and further advantages and features of the invention are explained in greater detail below with reference to the accompanying figure.

DESCRIPTION OF THE PREFERRED EMBODIMENTS

Figure 2:
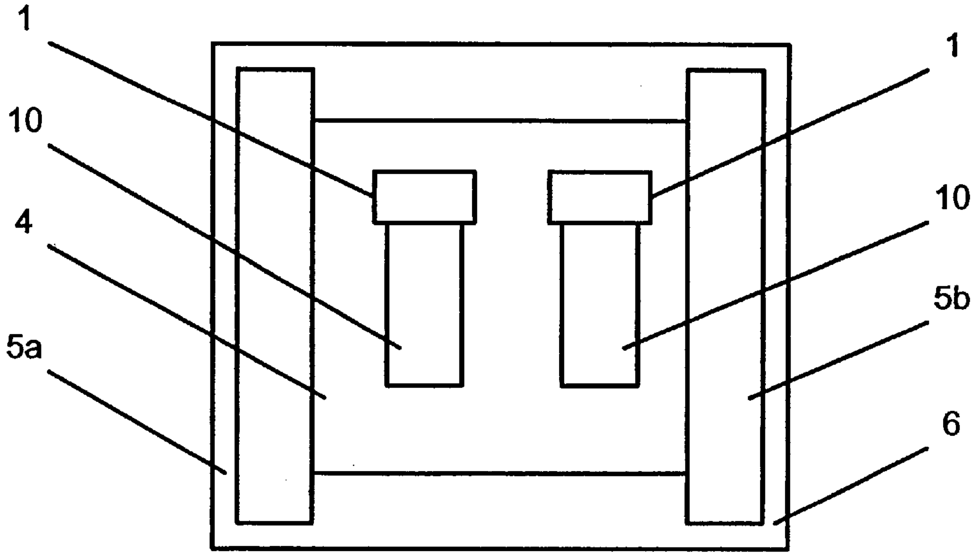
FIG. 2 is a schematic bottom plan view of the device of FIG. 1.
Figure 3:
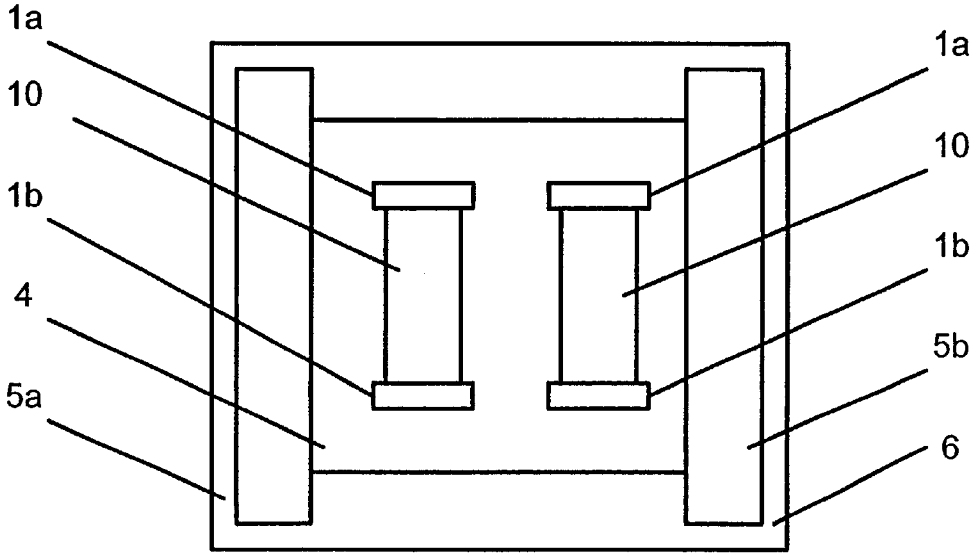
FIG. 3 is a schematic bottom plan view of a variant of the device of FIGS. 1 and 2.

Two diagrammatically illustrated centrifugal weights 1 are held rotatably in the form of unbalance weights on rotary shafts 2 and are driven by respective electric motors 10 (FIGS. 2) via the rotary shafts 2. In another embodiment of the invention, there are two centrifugal weights 1A and 1B in the depth direction of the FIG. 1 and the drive motor 10 is arranged between them as seen in FIG. 3. However, such arrangements are already known from devices with positively synchronized centrifugal weights, and no further description of these will therefore be given.

The centrifugal weights 1, the rotary shafts 2 and the drive motors 10 (FIG.2) are each connected to a common carrier 4 by means of respective supports 3. The carrier 4 is a relatively thick steel plate and should be as torsionally rigid as possible.

The supports 3 are welded or bolted rigidly to the carrier 4 and form with the carrier 4 a structure that should likewise be as rigid as possible.

On two of its sides, the carrier 4 is held by holding units 5*a* and 5*b* that form a holder and are in turn welded rigidly to a bracket 6. In other embodiments (not shown), the holding units are not welded to the bracket but bolted to it. The holding units 5*a* and 5*b* fit over the carrier 4 in the manner of hooks, spring elements 7 being inserted between the carrier 4 and the holding units 5*a*, 5*b*. The spring elements 7 can, for example, be composed of rubber or flexible plastic and, if necessary, can also have damping properties.

Figure 1:
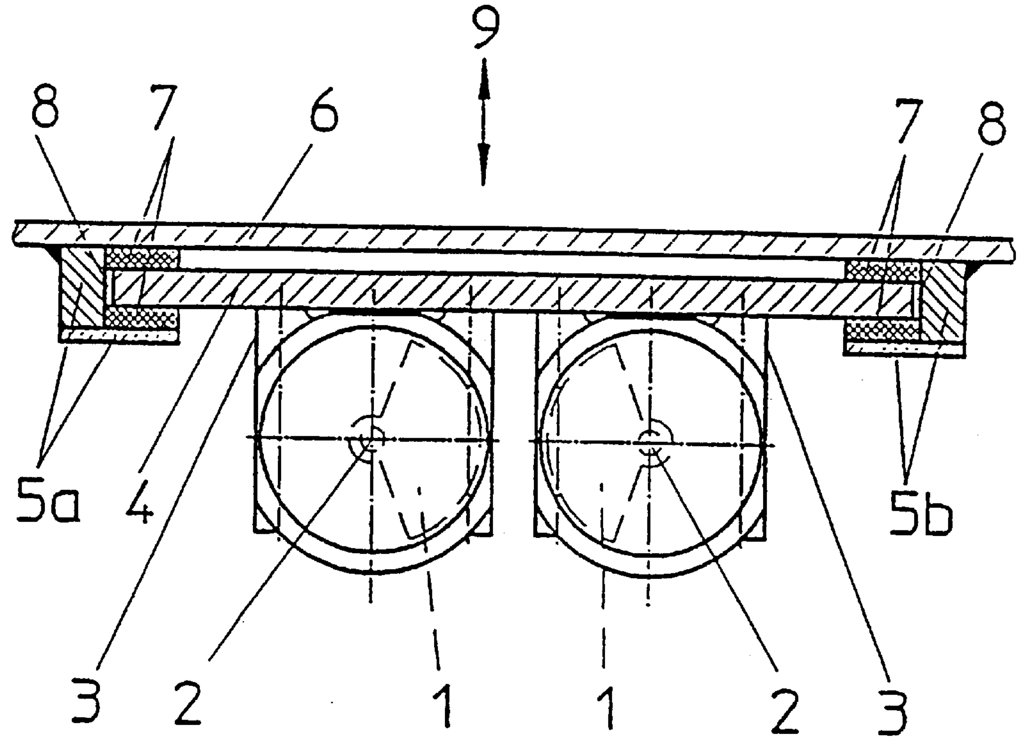
FIG. 1 is a sectional representation of a device in accordance with one embodiment of the invention.

FIG. 1 shows that there is a gap 8 between each side of the carrier 4 and the holding units 5*a*, 5*b*. This gap 8 allows the carrier together with the unbalance units attached to it to move slightly in the horizontal direction (with reference to FIG. 1) as the centrifugal weights 1 start to rotate, this being necessary for the synchronization of the centrifugal weights 1. In another embodiment (not shown), the gap 8 can likewise be filled by a spring element to prevent the carrier 4 from directly striking the holding units 5*a*, 5*b*.

To produce the directional vibration, an opposed rotary motion at essentially the same speed is imparted to the centrifugal weights 1 by the drive motors 10. Since the product of the mass of the unbalance weights and the radius of their center of gravity is essentially the same, the centrifugal forces arising from the rotation are also essentially the same. The fact that their rotation is opposed means that the horizontal components of the centrifugal forces—as seen in FIG. 1—cancel each other out, while the vertical components of the centrifugal forces, these components being aligned in the direction of arrow 9, add up and thus produce a directional vibration in the direction of arrow 9. The directional vibration perpendicular to a plane drawn through the axes of rotation 2 is transmitted via the rigid carrier 4 and the spring elements 7 to the bracket 6, where they can be used in the desired manner.

When the device is being used, the bracket 6 can be mounted on a structure or an implement in order to introduce the directional vibration in the desired manner. It is likewise possible for the bracket 6 already to be part of the structure or implement to be excited. For example, the bracket 6 can be part of a vibrating plate for soil compaction or a formwork facing of a vibrating table for concrete compaction.

Of course, the device can be used not only with the vibrating table mentioned or the vibrating plate but also with any other device in which directional vibrations are required.

The embodiments shown in the drawings have two holding units 5*a*, 5*b*. Given a smaller embodiment of the invention, it is also possible to attach the carrier 4 to the bracket 6 using just one holding unit.

What is claimed is:

1. A device for producing directional vibrations, comprising:

at least two centrifugal weights with essentially the same m x r which can be driven in rotation in opposite directions at essentially the same speed about mutually parallel axes of rotation;

a largely rigid carrier, on which the centrifugal weights, are rotatably mounted; and a bracket on which the carrier can be mounted in such a way by means of a holder that the carrier can be moved relative to the bracket, the holder having at least one spring element for transmitting the movement of the carrier in the direction of the directional vibration and in a direction perpendicular to the directional vibration and perpendicular to the axes of rotation of the centrifugal weights, wherein the centrifugal weights can be driven independently of one another and the stiffness of the spring element is matched to the stiffness of the carrier.

2. The device according to claim 1, wherein the carrier can be moved relative to the bracket in the direction of the directional vibration to be produced and in a direction perpendicular to the direction of vibration and perpendicular to the axes of rotation of the centrifugal weights.

3. The device according to claim 1, wherein the vibration to be produced is aligned perpendicular to a plane drawn through the axes of rotation of the centrifugal weights.

4. The device according to claim 1, wherein the holder has two holding units which are attached to the bracket and between which the carrier is accommodated in a movable manner.

5. The device according to claim 4, wherein each of the holding units has a spring element into which the carrier is inserted.

6. The device according to claim 1, wherein a respective drive for each centrifugal weight is arranged on the carrier.

7. The device according to claim 1, wherein the centrifugal weights are arranged in two sets in two sets with a with a separate drive motor being provided for each set of centrifugal weights and supporting one half of each set of centrifugal weights at each end thereof.

8. The device according to claim 1, wherein the bracket is part of a structure into which the directional vibrations can be introduced.

9. The device according to claim 8, characterized in that the structure is a vibrating table or a vibrating plate.

10. A method of producing directed vibrations, comprising:

providing a device according to claim 1 as an external vibrator on a vibrating table or as a vibration exciter on a vibrating plate; and rotating the centrifugal weights to produce the directed vibrations.

11. A device for producing directional vibrations, comprising:

at least two centrifugal weights with essentially the same m x r which can be driven in rotation in opposite directions at essentially the same speed about mutually parallel axes of rotation;

a largely rigid carrier, on which the centrifugal weights, of which there are at least two, are rotatably mounted; and a bracket on which the carrier can be mounted in such a way by means of a holder that the carrier can be moved relative to the bracket, the holder having at least one spring element for transmitting the movement of the carrier in at least the direction of the directional vibration, wherein the centrifugal weights can be driven independently of one another and the stiffness of the spring element or of the spring elements is matched to the stiffness of the carrier.

12. A device to produce directional vibrations, comprising at least two centrifugal weights which have essentially the same m x r and which are configured to be rotated with at least essentially the same RPM in opposite directions about parallel axes;

at least two independently operated drive units, each of which is configured to drive a dedicated one of the centrifugal weights such that the centrifugal weights are driven independently of one another;

a largely rigid carrier to which the at least two centrifugal weights are rotatably mounted; and a bracket to which the vibrations are imparted;

a holder which supports the carriage on the bracket so as to permit movement of the carriage relative to the bracket, the holder including at least one spring element configured to transfer the motion of the carrier in the direction of the directed vibration and in a direction perpendicular to the directed vibration and perpendicular to the rotating axes of the centrifugal weights, wherein a stiffness of the spring element substantially equals a stiffness of the carrier.

13. A device according to claim 12, wherein the carrier can move relative to the bracket in the direction of the vibrations to be produced as well as in a direction perpendicular to the vibration direction and perpendicular to the rotating axes of the centrifugal weights.

14. A device according to claim 12, wherein the vibration to be produced is directed perpendicular to a plane in which the rotating axes of the centrifugal weights lie.

15. A device according to claim 12, wherein the holder has two holding units fastened to the bracket between which the carrier is moveably held.

16. A device according to claim 15, wherein each of the holding units has a spring element into which the carrier is inserted.

17. A device according to claim 12, wherein each drive motor is flanked by two centrifugal weights and drives the two flanking centrifugal weights.

18. A device according to claim 12, wherein the bracket is a component of a structure into which the directed vibrations can be introduced.

19. A device according to claim 18, wherein the structure is a jairing table or a vibration plate.

20. A method of producing directed vibrations, comprising:

providing a device according to claim 12 as an exterior vibrator on a jarring table or as a vibrator on a vibration plate; and rotating the centrifugal weights to produce the directed vibrations.

21. A device for producing directional vibrations, comprising:

at least two centrifugal weights which have essentially the same m x r and which are configured to be driven in rotation in opposite directions at essentially the same speed about mutually parallel axes of rotation;

an essentially rigid carrier on which the centrifugal weights are rotatably mounted; and a bracket to which the vibrations are imparted;

a holder which supports the carriage on the bracket so as to permit movement of the carriage relative to the bracket, the holder including at least one spring element configured to transfer the motion of the carrier in the direction of the directed vibration and in a direction perpendicular to the directed vibration and perpendicular to the rotating axes of the centrifugal weights, wherein a stiffness of the spring element substantially equals a stiffness of the carrier.

* * * * *